United States Patent [19]

Riezler

[11] Patent Number: 5,188,215
[45] Date of Patent: Feb. 23, 1993

[54] APPARATUS FOR THE TRANSPORTATION OF GOODS TO BE CONVEYED

[75] Inventor: Wendelin Riezler, Mindelheim, Fed. Rep. of Germany

[73] Assignee: Grob Werke GmbH & Co. KG, Mindelheim, Fed. Rep. of Germany

[21] Appl. No.: 834,846

[22] Filed: Feb. 13, 1992

[30] Foreign Application Priority Data

Jun. 7, 1991 [DE] Fed. Rep. of Germany ....... 4118778

[51] Int. Cl.⁵ .............................................. B65G 13/06
[52] U.S. Cl. ..................................... 198/781; 198/791
[58] Field of Search ............................... 198/781, 791

[56] References Cited

U.S. PATENT DOCUMENTS 3,610,406 10/1971 Fleischauer et al. ............... 198/781
4,325,474 4/1982 Rae .
4,469,220 9/1984 Becker ................................ 198/781

FOREIGN PATENT DOCUMENTS 199045 10/1986 European Pat. Off. ............ 198/781
2752610 5/1979 Fed. Rep. of Germany ...... 198/781

Primary Examiner—Joseph E. Valenza
Attorney, Agent, or Firm—Jacobson, Price, Holman & Stern

[57] ABSTRACT

The roller shafts 1 of an apparatus for the transportation of goods to be conveyed are driven by a longitudinal shaft 15 via a respective angle gear 13, 14. A friction clutch 3 is provided on the longitudinal shaft 15. The two clutch elements 6 and 7 of this friction clutch are pressed against one another by permanent magnets 8 which cooperate with a magnetically operating counterpart 11. The design avoids the use of springs and structurally is very simple.

12 Claims, 2 Drawing Sheets

APPARATUS FOR THE TRANSPORTATION OF GOODS TO BE CONVEYED

FIELD OF THE INVENTION

The invention relates to an apparatus for the transportation of goods to be conveyed.

BACKGROUND OF THE INVENTION

Many such apparatus have a plurality of roller shafts which are arranged in parallel to one another in a frame, with a common drive mechanism for the roller shafts and with a respective friction clutch between the drive mechanism and the individual roller shafts. The friction clutch substantially comprises two clutch elements, each of which has a friction surface and which are each in driving connection with the drive mechanism and the respective roller shaft. A pressure device presses the friction surfaces of the clutch elements against one another.

An apparatus of the above type has been disclosed, for example, by U.S. Pat. No. 4,325,474. In this apparatus, at their ends the parallel roller shafts bear sprocket wheels which are driven by a common chain. A friction clutch is provided between the sprocket wheel and the roller shaft and the two parts of the clutch elements are pressed against one another by a spring.

In the case of transport apparatus comprising such roller shafts, the goods to be conveyed are either arranged directly on the roller shafts or the roller shafts bear pallets for the goods to be conveyed. The goods to be conveyed are optionally periodically halted, and in order to avoid friction phenomena at the periphery of the conveying rollers, friction clutches are arranged between the common drive mechanism and the roller shafts, which friction clutches are generally adjustable and permit sliding above a specific torque.

U.S. Pat. No. 4,819,787 describes another transport apparatus for the same purpose. In this design a longitudinal shaft is provided and the individual friction clutches are arranged thereon. An angle gear, namely a friction gear, is arranged between the driven clutch element of the friction clutch and the roller shaft.

In order to produce the driving force, friction clutches of the known type employ springs which, for example, have the form of helical springs and embrace the drive shaft. In many designs the springs also transmit the torque. The replacement of fatigued or fractured springs is complicated, particularly when these surround the drive shaft.

SUMMARY OF THE INVENTION

It is an object of the present invention to provide an improved apparatus for the transportation of goods, in that simple assembly and servicing together with reliable functioning are facilitated and also in that the device has only a small space requirement.

Accordingly the present invention provides an apparatus for the transportation of goods to be conveyed, comprising:

a frame;

a plurality of roller shafts which are arranged in parallel to one another in said frame;

a common drive mechanism for driving said roller shafts; and a respective friction clutch between the drive mechanism and each said individual roller shaft for transmitting drive from said drive mechanism to each said roller shaft; and wherein the friction clutch comprises:

a) first and second clutch elements, having opposing friction surfaces; and b) a pressure device comprising at least one permanent magnet and a cooperating magnetically operating counterpart for urging the friction surfaces of the clutch elements against one another.

In contrast to a known pressure device employing one or more springs, the use of permanent magnets does not in itself require an abutment, although in the case of specific designs an abutment can be favourable. Fatigue phenomena, spring fractures and the like do not occur in the case of the device according to the invention which thus operates particularly reliably. The external dimensions are very small. Moderate wear does not influence the correct functioning. In particular, the cooperating parts, namely the permanent magnet and the magnetically operating counterpart, can rotate with respect to one another without thereby influencing the function.

In a preferred form of the invention respective angle gear, in particular a bevel gear, driven by a longitudinal shaft, is arranged at the ends of the roller shafts and the angle gear member rests on the longitudinal shaft under the pressure influence of the permanent magnet arrangement.

It is also favourable for the permanent magnet to be permanently connected to the first clutch element and for the magnetically operating counterpart to be permanently connected to the other clutch element.

For example, in accordance with the invention a plurality of permanent magnets can be provided which are inserted in recesses of a clutch element. In this way it is possible to change the transmittable torque by changing the number of permanent magnets used.

In another mode of construction it is provided that the permanent magnet is ring-shaped and the drive shaft in particular surrounds the longitudinal shaft.

The magnetically operating counterpart can consist, for example, of iron. However, in order to increase the effect it is favourable also to use a permanent magnet for the counterpart.

Fundamentally two arrangements are possible in accordance with the invention. In the first arrangement the permanent magnet attracts the counterpart. This force acts upon the clutch.

In the second arrangement the repulsion effect between two permanent magnets is employed. In this case it is favourable for the two permanent magnets to be arranged between an abutment and a clutch element, with like poles facing one another. This mode of construction has the advantage that the magnetic elements can be withheld from the region of the friction surfaces, whereby relatively large friction surfaces can be obtained.

The abutment is preferably adjustable.

In the preferred embodiment of the invention it is provided that a sleeve which can be fixed in position, in particular which can be clamped in position, is arranged on the longitudinal shaft and is permanently, e.g. integrally, connected to the first clutch element, and that the other clutch element is mounted on the sleeve, and that the sleeve bears two ring-shaped, mutually repellent permanent magnets and an adjustable abutment in the form of a counter-nut arrangement.

The clutch elements are preferably produced from synthetic resin. In this way the device according to the invention can be designed so as to require no or only little finishing. In view of the fact that the transport devices for conveyed goods referred to in the introduction require a large number of such friction clutches, simple and cheap production is particularly important.

DETAILED DESCRIPTION OF THE DRAWINGS

Figure 1:
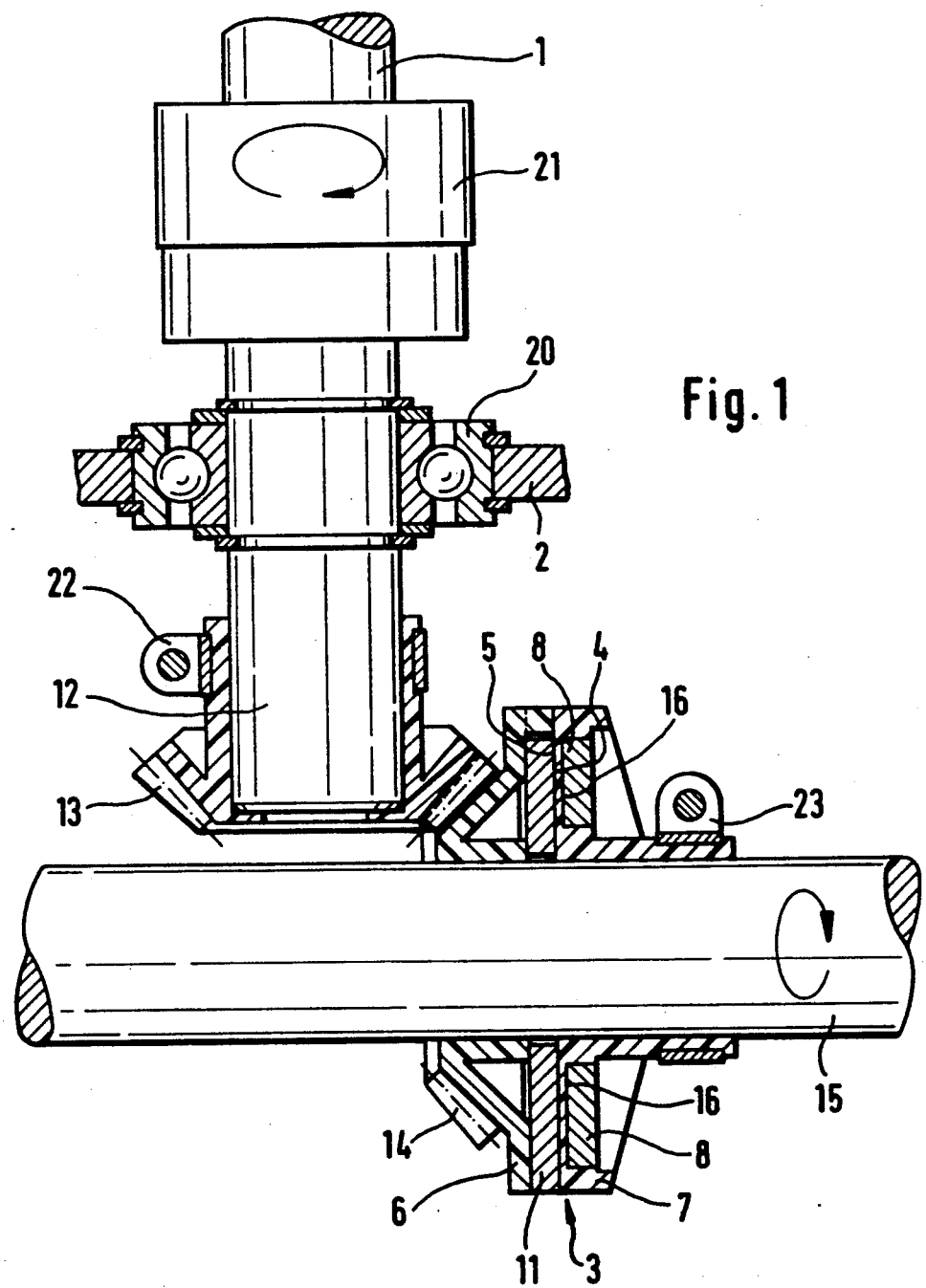
FIG. 1 is a plan view of a section through a part of a preferred embodiment of an apparatus according to the present invention.

A bearing 20, which bears a roller shaft 1, is arranged in a frame 2, the individual parts of which have not been shown in detail. This roller shaft 1 can possess a uniform, cylindrical outer surface, but can also be permanently connected to rollers 21 which support the load to be transported. Normally the frame 2 bears a plurality of such roller shafts 1 which are mounted in parallel beside one another in the frame 2. Here all the roller shafts can be connected to a drive mechanism, but it is also possible only to pivot-mount part of these rollers and to provide another part thereof with a drive mechanism.

At the end 12 of the roller shaft 1, a bevel gearwheel 13 is arranged on the roller shaft, and in particular is clamped by a clip 22. Both the bevel gearwheel 13 and a bevel gearwheel 14, which cooperates therewith, are composed of synthetic resin.

In the exemplary embodiment shown in FIG. 1 the bevel gearwheel 14 is part of a friction clutch 3 and forms an integral unit with a clutch element 6 which is coacially mounted on the shaft 15 to be rotatable on the shaft. This clutch element 6 bears a ring-shaped, magnetically operating counterpart 11 which surrounds a longitudinal shaft 15. This counterpart 11 can be glued, for example, to the clutch element 6 or also retained by conventional fixing means. At its periphery the counterpart 11 possesses projections which cooperate with corresponding recesses of the clutch element, thereby inhibiting rotation.

A clutch element 7 is also retained on the longitudinal shaft 15, for example, by a clip 23. The clutch element 7 comprises recesses 16 which are uniformly distributed over the periphery and which each receive a permanent magnet 8. The permanent magnets 8 can be equal or different in size. It is also possible to equip the recesses 16 only partially with permanent magnets, which provides a possibility of changing the pressure force of the friction clutch 3, whereby it is likewise possible to change the transmittable torque.

The clutch elements 6 and 7 cooperate in respect of their friction surfaces 4 and 5, the friction surface 4 being formed by one side of the counterpart 11.

The correct position of the two bevel gearwheels 13 and 14 of the angle gear can be defined by means of the clips 22 and 23. Forces of magnetic attraction are active between the permanent magnets 8 and the counterpart 11, so that the driving force of the rotating longitudinal shaft 15 is transmitted to the roller shaft 1.

If the goods to be conveyed which are arranged on the roller shafts 1 or rollers 21 are halted for any reason, whether because a processing station is provided or because a jam occurs, the friction clutch 3 becomes operative and the clutch element 6 slips against the clutch element 7 on the longitudinal shaft 15, which continues to rotate so that the other roller shafts driven by the longitudinal shaft 15 likewise continue to rotate.

Figure 2:
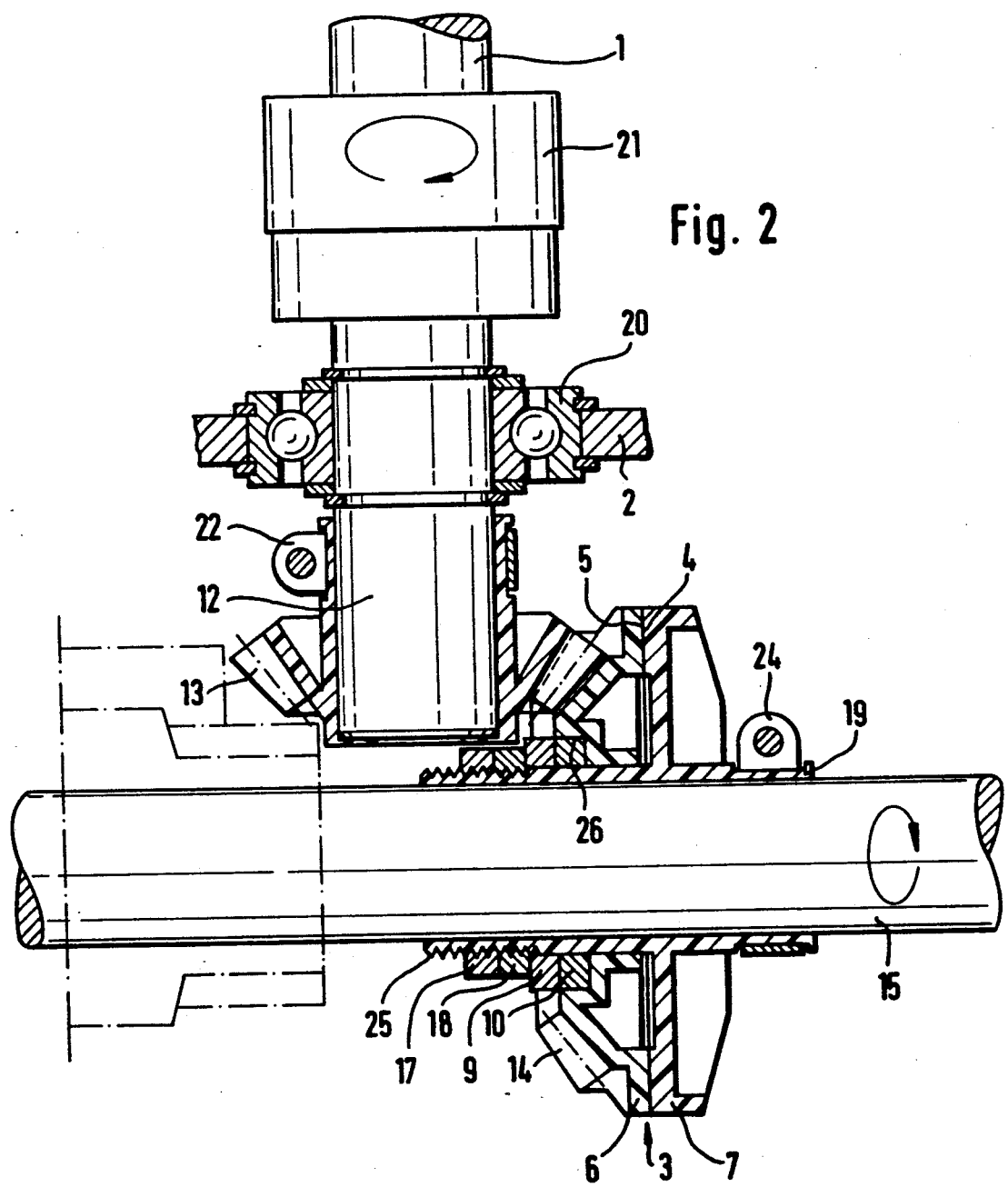
FIG. 2 is a diagram of a modified embodiment of the invention.

In the exemplary embodiment illustrated in FIG. 2 the design of the roller shaft 1 and also the design, arrangement and bearing of the bevel gearwheel 13 are identical to the embodiment shown in FIG. 1. However, in the case of the exemplary embodiment illustrated in FIG. 2 the longitudinal shaft 15 is provided with a sleeve 19 which is retained on the longitudinal shaft 15 by means of the clip 24. At its end opposite the clip 24 this sleeve 19 is provided with external threading 25 for the screw-on abutments 17 and 18. The parts 17 and 18 serve as a counter-nut arrangement and form a support for the two permanent magnets 9 and 10 which are ring-shaped. Here the permanent magnets 9 and 10 are polarised in the axial direction and are arranged on the sleeve 19 in such manner that like poles face one another. In this way a repellent force occurs between these permanent magnets. The first permanent magnet of this arrangement acts as magnetic counterpart to the other permanent magnet.

The permanent magnet 10, which is arranged in an appropriately adapted recess 26 of the clutch element 6, presses the friction surface 4 of this clutch element against the friction surface 5 of the other clutch element 7. This clutch element 7 forms an integral unit with the sleeve 19.

It will be clear that the pressure force with which the two friction surfaces 4 and 5 are pressed against one another can be regulated by the counter-nut arrangement 17 and 18. In the case of slight wear the pressure force is maintained. If heavier wear occurs or if the pressure force is to be changed, this can be adjusted by means of the counter-nut arrangement 17, 18 which forms the abutment.

I claim:

1. An apparatus for the transportation of goods to be conveyed, comprising:
   a frame;
   a plurality of roller shafts arranged in parallel to one another in said frame;
   a common drive mechanism for driving said roller shafts; and
   a respective friction clutch between the drive mechanism and each said individual roller shaft for transmitting drive from said drive mechanism to each said roller shaft;
   and the friction clutch including:
   a) first and second clutch elements, having opposing friction surfaces; and
   b) a pressure device comprising at least one permanent magnet and a cooperating magnetically operating counterpart for urging the friction surfaces of the clutch elements against one another;
   said magnetically cooperating counterpart being a permanent magnet, and said permanent magnets having like poles facing one another and arranged between an abutment and one of said clutch elements for urging said clutch element friction surfaces against one another.

2. An apparatus according to claim 1 wherein:
   said drive mechanism has a longitudinal drive shaft for transmitting drive to said roller shafts;
   said first clutch element is mounted on said drive shaft for rotation therewith; and
   said second clutch element is coupled to the respective roller shaft by way of a bevel gear, said second clutch element being mounted on said drive shaft and rotatable relative thereto.

3. An apparatus according to claim 1 wherein said permanent magnet is permanently connected to one of said clutch elements and said magnetically operating counterpart is permanently connected to the other of said clutch elements.

4. An apparatus according to claim 1 wherein said permanent magnet is ring-shaped.

5. An apparatus according to claim 1 wherein said pressure device comprises a plurality of permanent magnets located in recesses of one of said clutch elements.

6. An apparatus according to claim 1 wherein said magnetically operating counterpart is ring shaped.

7. An apparatus according to claim 1 wherein the position of said abutment is adjustable toward and away from said one of said clutch elements.

8. An apparatus according to claim 1 wherein said drive mechanism comprises a longitudinal drive shaft for transmitting drive to said roller shafts and a sleeve secured on the longitudinal shaft, and wherein said sleeve is secured to said first clutch element, said second clutch element is rotatable on the sleeve, and said sleeve carries two ring-shaped, mutually repellent permanent magnets positioned between an abutment and said second clutch element for urging said clutch element friction surfaces together, and wherein the position of said abutment is adjustable towards and away from said second clutch element.

9. An apparatus according to claim 1 wherein the clutch elements are composed of synthetic resin.

10. An apparatus for the transportation of goods to be conveyed, comprising:

a frame;
a plurality of roller shafts arranged in parallel to one another in said frame;
a common drive mechanism for driving said roller shafts; and
a respective friction clutch between the drive mechanism and each said individual roller shaft for transmitting drive from said drive mechanism to each said roller shaft;
and the friction clutch including:
a) first and second clutch elements, having opposing friction surfaces; and
b) a pressure device comprising at least one permanent magnet and a cooperating magnetically operating counterpart for urging the friction surfaces of the clutch elements against one another;
said drive mechanism including a longitudinal drive shaft for transmitting drive to said roller shafts and a sleeve secured on the longitudinal shaft, and wherein said sleeve is secured to said first clutch element, said second clutch element being rotatable on the sleeve, and said sleeve carrying two ring-shaped, mutually repellent permanent magnets positioned between an abutment and said second clutch element for urging said clutch element friction surfaces together, and the position of said abutment being adjustable towards and away from said second clutch element.

11. An apparatus according to claim 1, wherein said clutch is arranged on a common primary shaft, and said clutch is driving a bevel gear drive for the rollers.

12. An apparatus according to claim 11, wherein the position of said abutment is adjustable toward and away from said one of said clutch elements.

* * * * *